United States Patent [19]

Babcock et al.

[11] Patent Number: 5,286,425
[45] Date of Patent: Feb. 15, 1994

[54] METHOD OF INSTALLING A CEMENTITIOUS COMPOSITION

[75] Inventors: H. Nash Babcock, Old Greenwich; Edward P. Holub, Trumbull, both of Conn.

[73] Assignee: Nomix Corporation, Fairfield, Conn.

[21] Appl. No.: 874,905

[22] Filed: Apr. 28, 1992

Related U.S. Application Data

[60] Continuation of Ser. No. 199,556, May 27, 1988, Pat. No. 5,108,790, and a continuation of Ser. No. 518,040, May 2, 1990, and a continuation-in-part of Ser. No. 168,715, Mar. 16, 1988, Pat. No. 5,219,222, which is a continuation-in-part of Ser. No. 53,561, May 21, 1987, Pat. No. 4,732,782, and a continuation-in-part of Ser. No. 49,906, May 15, 1987, Pat. No. 4,747,878, which is a division of Ser. No. 843,316, Mar. 24, 1986, abandoned, said Ser. No. 53,561, is a continuation-in-part of Ser. No. 843,316, Mar. 24, 1986, said Ser. No. 199,556, is a continuation-in-part of Ser. No. 101,908, Sep. 28, 1987, Pat. No. 4,839,115, which is a division of Ser. No. 53,561, Sep. 28, 1987, which is a continuation-in-part of Ser. No. 843,316, Mar. 24, 1986, abandoned, said Ser. No. 518,040, is a continuation of Ser. No. 199,556, May 27, 1988, Pat. No. 5,108,790.

[51] Int. Cl.$^5$ .................. B32B 35/00; E02D 5/18; E02D 5/34; E04B 1/16
[52] U.S. Cl. ........................ 264/31; 52/742; 264/122; 264/333; 405/222; 405/267; 427/136; 427/140; 427/181; 427/403
[58] Field of Search ............. 264/31-35, 264/36, 333, 133, 109, 122, 42, DIG. 43, 240, 219, 299, 334; 427/427, 180, 181, 140, 136, 403, 397.7; 405/266, 267, 222-224; 106/85, 89, 97; 52/742

[56] References Cited

U.S. PATENT DOCUMENTS

| 188,123 | 3/1877 | Goodridge, Jr. |
|---|---|---|
| 743,525 | 11/1903 | Lake . |
| 1,476,938 | 12/1923 | Walper .................. 264/212 |
| 3,665,720 | 5/1972 | Havno . |
| 4,366,209 | 12/1982 | Babcock . |
| 4,732,781 | 3/1988 | Babcock et al. . |
| 4,732,782 | 3/1988 | Babcock et al. . |
| 4,747,878 | 5/1988 | Babcock et al. . |
| 4,772,326 | 9/1988 | Heinen et al. . |
| 4,839,115 | 6/1989 | Babcock et al. ......... 264/333 X |
| 4,913,862 | 4/1990 | Babcock et al. . |
| 5,108,790 | 4/1992 | Babcock .................. 264/333 |

FOREIGN PATENT DOCUMENTS 2027466 9/1970 France .

OTHER PUBLICATIONS

The Cement Association of Japan-Review of the Twenty-Seventh General Meeting-Technical Session-Held in Tokyo-May 1973, pp. 199-201.

Primary Examiner—Karen Aftergut
Attorney, Agent, or Firm—Weingram & Zall

[57] ABSTRACT

A method of installing a cementitious composition includes providing a dry fast setting cementitious composition having a set time and in the form of finely divided particles of at least one cement binder, pouring an amount of the dry cementitious composition into a volume of water located in a hole without any type of physical mixing of the cementitious composition and water other than the mixing which occurs merely by applying the cementitious composition into the water. The major portion of the particles of the cementitious composition have approximately the same drop rate through the volume of water. The water contacts the dry cementitious composition when poured into the volume of water to hydrate the particles of the dry cementitious composition, the particles of cementitious composition dropping through the water to displace excess water and form the hydrated cementitious composition particles in a substantially non-segregated mass. The hydrated cementitious composition is then allowed to set and cure to a solid mass for at least the set time, e.g. less than 10 minutes.

16 Claims, No Drawings

METHOD OF INSTALLING A CEMENTITIOUS COMPOSITION

RELATED APPLICATIONS

This application is a continuation application of U.S. Ser. No. 199,556 filed May 27, 1988, now U.S. Pat. No. 5,108,790, which is a continuation-in-part of U.S. Ser. No. 101,908 filed Sep. 28, 1987, now U.S. Pat. No. 4,839,115, which is a divisional of U.S. patent application Ser. No. 053,561 filed May 21, 1987, now U.S. Pat. No. 4,732,782, which is a continuation-in-part of U.S. Ser. No. 843,316 filed Mar. 24, 1986, now abandoned. This application is also a continuation-in-part of U.S. Ser. No. 07/168,715 filed Mar. 16, 1988, now U.S. Pat. No. 5,219,222 dated Jun. 15, 1993, which is (a) a continuation-in-part of application U.S. Ser. No. 07/053,561, filed May 21, 1987, now U.S. Pat. No. 4,732,782, which is a continuation-in-part of U.S. Ser. No. 06/843,316, filed Mar. 24, 1986, now abandoned; and (b) a continuation-in-part of U.S. Ser. No. 07/049,906, filed May 15, 1987, now U.S. Pat. No. 4,747,878, which is a division of U.S. Ser. No. 07/843,316 filed Mar. 24, 1986, now abandoned. This application is also a continuation application of U.S. Ser. No. 07/518,040 filed May 2, 1990, now allowed, which is a continuing application of U.S. Ser. No. 199,556 filed May 27, 1988, now U.S. Pat. No. 5,108,790. All of the foregoing applications and patents are incorporated herein by reference.

FIELD OF THE INVENTION

The present invention relates to methods and compositions for the application or placement of cementitious compositions which do not require premixing with water.

BACKGROUND OF THE INVENTION

At present, it is essential that all cementitious compositions are mixed with water before placement in order to obtain the proper characteristics of the final product. Some type of mixing is and has always been required. Some manufacturers of premixes, usually in a container having instructions thereon, have put the dry premix in a hole and then recommended adding the water. Some have put premixes in bags and dropped the mixes while in bags through the water, then after the bags are in place, letting water penetrate through the bag to the mix. However, these systems have not allowed full hydration. Mortar mixers, concrete mixers, hand mixing or other types of wet mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components with water.

SUMMARY OF THE INVENTION

The present invention relates to dry cementitious compositions which have finely divided particles of at least one cement binder. The composition is usually in a container, e.g. a bag having instructions associated therewith. The cement may be Portland cement, gypsum, high aluminum cement, or mixtures thereof, but not restricted thereto. Magnesium phosphate or other fast-setting compounds may also be used. The major proportion of particles have approximately the same drop rate in water, so that when poured through water according to the invention, the material does not appreciably segregate.

These compositions may further include a filler component of sand or aggregate particles, provided that the major portion of those particles have a drop rate in water which is approximately the same as the cement particles. Also, the cementitious mixture should be able to absorb and/or combine with water in the amount approximately 50% by volume. The higher the amount of water the cementitious mixture can tolerate, the better the finished product.

It is possible to use other additives in these compositions. Such additives may include, but are not limited to, accelerators, water reducing compounds, waterproofing agents, polymers, drying shrinkage inhibitors, wet shrinkage inhibitors, lime, pigments and the like, and may be added to improve or impart a particular property to the composition.

The invention also relates to a method for making these compositions. These methods include providing the cement binder in the form of finely divided particles and adjusting the drop rate of the major portion of particles to approximately the same range. Filler components, if added, are treated the same. When fillers are added, it is preferable to mix the dry ingredients to a homogenous consistency.

The invention also contemplates various methods for installing cement products upon a substrate which comprises saturating the substrate with an amount of water which is substantially in excess of the amount of water necessary to completely hydrate the normal amount of dry components which are subsequently added. The dry powder is added without mixing in a manner such that it combines with a portion of the water and displaces the remainder of the water. The applied combination is then allowed to cure a final product.

Specific methods are presented hereinbelow, particularly a method for installing a post in a post hole.

DETAILED DESCRIPTION OF THE PREFERRED EMBODIMENTS

This invention relates to dry cementitious compositions which are poured, trowled or sprayed through excess water or onto wet surfaces without mixing to hydrate the cement component and obtain high strength products after setting and curing. Cementitious compositions of Portland cements, gypsums, high alumina cements, other specialty cements and combinations, as well as other chemicals such as magnesium phosphates, all have been successfully used, the only limitation being that at least one component of the cementitious composition is hydrated by or reacts with water.

By this term "fast setting" it is meant a cementitious composition which sets faster than the most common Portland cement, i.e., type I or type II.

By "cement binder" what is meant is a material, usually of a cementitious nature, which sets or cures upon contact with the hydration by water to form a solid mass which is useful for forming blocks, shapes, structures, walls, floors, or other surfaces for use as a supporting or load bearing member. The cement binder may be used alone or with various additives and fillers, usually sand or aggregate, to form the desired member after setting and curing. In addition to the well known cement binders, such as Portland cement, aluminous cement, gypsum and its variations, magnesium phosphate cements and the like, other materials, such as the silicates, are also contemplated as being within the scope of this term since they perform in a manner similar to the cements. Aluminum silicate is a specific example of this type material, and it is used for specialty applications due to its relatively high cost compared to the other cement materials previously mentioned.

When the formulations of these cementitious compositions are properly controlled, the problems of thorough wetting of the cement without overwetting, of segregation of components, and of loss of compressive strength of the cured product are greatly reduced or eliminated.

Where cement coatings are desired, the surface area to be coated is first pre-wetted and saturated with water. The dry cementitious mixture is placed on the surface, instantly reacting with the wet surface. If additional layers or a greater thickness of the coating is needed, the first cement layer can be pre-wetted and the dry composition sprayed directly thereupon to increase the thickness and structural strength of the overall coating.

On horizontal surfaces, the area to be poured with cement is first flooded with water, then the dry cementitious compositions of the invention can be poured into the water. The excess water is displaced by the cementitious composition, and the composition is then allowed to cure. This provides a fast, simple installation of cement without the need for tools, mixing apparatus, water measurement aids or the like. For floor leveling, for example, the floor can be flooded to form puddles in low areas. The dry cementitious composition is then sprinkled in the areas where puddles are formed, and allowed to cure. Thus, the floor is easily levelled by this procedure.

Alternatively, the dry cementitious compositions can be pumped or sprayed onto a saturated substrate a described above. This provides the end user with a wide, versatile range of installation methods from which they can choose the most appropriate for a particular application or end use.

The drop rate of the particles of the cementitious compositions is controlled to achieve the desired effect when the particles are poured through water without any other form of mixing. The drop rate of the particles through water is dependent upon several factors of which the density or specific gravity is but one. Although important, balancing the density alone is insufficient to achieve a uniform drop rate sufficient to prevent segregation or dilution of the particles. The size, shape and surface characteristics of each of the particles used, both alone and relative to the other components, must be considered to assess the resistance of the particles dropping through water. For example, round or teardrop shaped particles drop faster through water than coarse, flat or irregular shaped particles, even if each have the same density.

Other variables can be controlled to improve the drop rate. Surfactants can be added to the water separately or along with the dry composition itself to overcome surface tension and assist in the dispersal of the particles through the water is also a consideration, with shorter distances allowing a greater tolerance or differing drop rates. Thus, the dry composition can be introduced by a layering method to achieve the entire desired thickness without having to be dropped a large distance through water. A conduit can be used to direct the dry materials underwater so as to effectively reduce its dropping distance through the water. Dry blending all ingredients to a uniform homogenous composition also assists in achieving a uniform drop rate as well as in a improvement in the consistency and properties of the cured composition.

All these factors must be considered and routine tests conducted to obtain a dry cementitious system of components having balanced or similar drop rates so that no substantial segregation or substantial dilution of the particles occurs as the composition drops or falls through a quantity of water which is present in excess of that needed to hydrate the cement binder. Dropping the cement binder through the water assures that each cement article is hydrated without depending upon physical mixing.

In addition to the control of the drop rate of the particles, however, certain hydration agents can be included in the dry composition to assist in attaining a properly cured solid mass. By "hydration agent" we mean an additive or compound which enables dry composition to tolerate the excess water when dropping therethrough.

For example, a hydration agent of a water absorbing compound can be added to the composition in an amount sufficient to absorb a portion of the excess water to prevent over-hydration of the cement binder and to prevent dilution or segregation of the particles. Additional cement has been found to be another suitable absorbing agent. Fine sand can also be used for this purpose. Anhydrous salts, clay, superslurpers, fly ash or other hydrophilic materials may be used under certain conditions. At this time, additional cement or a second cement binder is the least expensive water absorbing agent and for that reason is preferred.

Alternatively, an accelerator can be added to the dry ingredients, as the hydration agent in an amount sufficient to impart relatively fast hydration properties to the cement binder to enable the composition to rapidly set and cure before the excess water can cause over-hydration, dilution or segregation of the composition. The accelerator can be added to the dry mixture or separately into the water. Instead of utilizing a separate accelerator, it is also possible to modify conventional cementitious materials to achieve faster setting compositions.

In this regard, the hydration agent can be heat (used to raise the temperature of the water to increase the setting and curing time of the cement binder when dropping therethrough) or other additives, such as surfactants, which enable the composition to drop through the water more easily.

Furthermore, the use of pure or clear water is not required, since the invention is operable in polluted or contaminated water or even seawater, since the method of dropping the cement binder particles through the water, rather than by physical mixing, assures that each particle becomes hydrated properly.

In Portland cement, one or more of the following changes would decrease the setting time of the mix and eliminate the need for the addition of accelerators:

1) increase the tricalcium aluminate ($3CaO\ Al_2O_3$) content to at least about 15% by weight of the clinker; In doing this, it is advantageous to reduce the dicalcium silicate ($2CaO\ SiO_2$) content accordingly. Also, it is suggested to maintain the iron oxide ($Fe_2O_3$) content as low as possible to avoid the formation of tetracalcium alumino ferrite (4CaO $Al_2O_3$ $Fe_2O_3$).

2) maintain the free lime (CaO) content as low as possible.

3) do not add gypsum ($CaSO_4$) or reduce the amount of gypsum added during the grinding stage. A preferred replacement is a carbonate compound such as sodium carbonate or an alkali metal sulfate other than calcium, such as sodium or magnesium sulfate. It is also possible to obtain advantageous compositions by utilizing a different form of gypsum, such as the hemihydrates, instead of the anhydrous or dihydrate forms presently used.

Controlling the rate of hydration may lead to many applications. For instance, for coating vertical surfaces, a very fast setting material can be used to eliminate the problems of running, sagging or failure to bond. Where mortar for bricklaying is desired, a material with a longer set time will allow the operator sufficient time to work with the material. For situations where the surface particles have not been properly wetted, additional water may be applied to the surface for more activation and further finishing. Preferred set times for installing posts are less than about 10 minutes and, where desirable less than about 5 minutes.

In the past, there has always been difficulty in controlling the amount of water for the patching of highways or other horizontal surfaces. This problem is solved by this invention because the amount of water is controlled by the formulation of the dry cementitious composition itself. For example, water can be placed into a footing, post hole, mortar joint or tube, or pothole and then the dry cementitious material may be placed by pouring, spraying, or screening into the cavity until the desired level is reached. Excess water, if present, is displaced from the hole by the dry material. The rate of setting of the cementitious mixture can be designed to meet the needs of the particular application. The amount of water required depends on the specific composition and application used.

For the placement of concrete foundations, a hole is first prepared, then filled with the required amount of water. If desired, forms can be used to help contain the water. The dry material can be then poured directly into the foundation area to the desired height, thus displacing the excess water, if any. After the material cures, the foundation is complete.

In certain circumstances, a cavity, e.g. a post hole having a post therein, could have a small percentage of water placed into it and then the first part of the cementitious mixture placed into the water. While this placement is taking place, additional water could then be placed into the hole by various methods simultaneously with the placement of the rest of the cementitious mixture. When the final quantity of the cementitious mixture is reached, the entire surface area could be sprayed for trowling or other finishing purposes as could be done when the entire mixture is poured through water.

In the situation where the cavity or hole is porous and cannot hold water, it is possible to thoroughly wet the surfaces of the hole and then introduce a fast setting cementitious mixture into the hole to partially seal the surfaces of the hole to retain water. It is then possible to pour water into the lined hole and proceed as above.

The control of density and size of the dry components and the rate of drop through water is essential for the proper performance of the cementitious mixtures.

The ability to use materials of various sizes and densities, whose drop rate would otherwise be higher if a slow setting cementitious mixture was used, is enhanced by the increased rate of the water activation of the cementitious particles to form a homogeneous mixture.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. In this manner, masonry walls can be built up with dry mortars which are hydrated after installation. Precast and prestressed sections are put in place, the dry mixture is placed in water in the joints and the surface can be wetted down for complete activation of the cement binder. The setting time of the binders can be accelerated to a few seconds or slowed up for days, depending upon the selection of cement component.

The system can be used with any normal additives acceptable to the specific composition. In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives o modifying agents can be added to the water or to the cement mix, in any order or combination.

The examples show the success of adding cementitious compositions to water after the water is in place.

When dry, pre-blended materials are used, there is a much greater potential for higher quality finished product.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5. All types of cementitious particles, such as gypsums, limes and so forth can be used.
6. All types of chemical cements, even with water soluble parts, can be used.
7. No wet mixing or blending equipment is required.
8. No addition of water to cementitious mixes is required before placement, thus avoiding clean up of equipment and waste.
9. When placements under deep water conditions where tremes, elephant trunks or pipes would be required, the material under this formula can be placed dry in the tube and activated by available water at the end of the line, thus keeping all conveyances clear of wet cement.
10. When cement contents are too low in mixtures to prevent proper strength development or prevent over-absorption of water, resulting in weak or segregated mixes, more cement may be added, or water absorption material may be added, to prevent excess water from decreasing the quality of the mix.

Present cement mixes with less than 20 percent by weight of a cementitious binder should have some additional water absorption agent in the mix to prevent overwatering and segregation. Ideally, cementitious compositions of the mixtures should have the maximum amount of water absorbency possible. The higher the ratio of chemical bonded water to the binder, the better and more versatile a product will be achieved.

Cementitious mixtures containing more than 20 percent by weight cement may or may not need additional cement or water absorbers, depending on the application. Generally, at least 35 percent by weight of a cement binder is preferred for use in the composition and methods of this invention.

While using liquids other than water, such as two component thermosetting organic compounds, an aggregate or sand can be dropped through the liquid or chemicals, causing the final mixture to be blended by gravity or by the solid ingredients passing through the liquid, which will result in a hardened mass of aggregate or sand and chemical.

EXAMPLES

The scope of the invention is further described in connection with the following examples which are set for the sole purpose of illustrating the preferred embodiments of the invention and which are not to be construed as limiting the scope of the invention.

In the examples that follow, the components of each cementitious composition were manufactured of finely divided particles having substantially the same drop rate in water, so that the advantages previously discussed could be achieved.

The first 9 of the following examples are cementitious materials that were poured into a 4"×8" cylinder which was filled with water. The material was poured until it reached a level of about ¼" below the top of the cylinder. The cementitious material was then allowed to cure. The results are described in the following examples 1 through 9.

| Substance (common sand/cement mix) | Percentage |
|---|---|
| EXAMPLE 1 | |
| Portland Cement Type I | 20% |
| Sand | 80% |
| Set time is 20 hours. | |
| Compressive strength at 24 hours is 0.0 psi (too little cement) | |
| EXAMPLE 2 | |
| Substance | |
| Portland Cement Type I | 90% |
| Sand | 10% |
| Set time 12 hours. | |
| Compressive strength at 24 hours is 1,100 psi. | |
| EXAMPLE 3 | |
| Portland Cement Type I | 50% |
| Sand | 50% |
| Set time 16 hours. | |
| Compressive strength at 24 hours is 600 psi. | |
| EXAMPLE 4 (Comparative Example) | |
| Portland Cement Type I | 50% |
| Pea Gravel | 50% |
| Set time 16 hours. | |
| Compressive strength at 24 hours is 0.0 psi. (different drop rates). | |
| EXAMPLE 5 | |
| Portland Cement Type II | 50% |
| Plaster of Paris | 50% |
| Set time is 10 minutes. | |
| Compressive strength at 24 hours is 1,600 psi. | |
| EXAMPLE 6 | |
| High Alumina Cement | 80% |
| Sand | 20% |
| Set time is 12 hours. | |
| Compressive strength at 24 hours is 1,100 psi. | |

| -continued | Percentage |
|---|---|
| EXAMPLE 7 | |
| High Alumina Cement | 20% |
| Sand | 80% |
| Set time is 20 hours. | |
| Compressive strength at 24 hours is 0.0 psi. (too little cement). | |
| EXAMPLE 8 | |
| High Alumina Cement | 25% |
| Portland Cement Type III | 25% |
| Lithium Carbonate | 1% |
| Sand | 49% |
| Set time is 5 minutes. | |
| Compressive strength at 24 hours is 1,100 psi. | |
| EXAMPLE 9 | |
| Magnesium Oxide | 30% |
| Ammonium Phosphate | 10% |
| Sand | 60% |
| Set time is 5 minutes. | |
| Compressive strength at 24 hours is 1,100 psi. | |

The following examples were based upon the preparation of cubes from a cube mold which was half filled with water and to which the dry cementitious components were added in the same manner as above.

A test was run wherein the resin and hardener were of approximate equal density in a epoxy formulation. The resin and hardener were poured into a container without premixing, then the aggregate was dropped through the resin and hardener, forming a homogeneous mixture which set into a hardened mass. The formulas given below.

| Substance | Percentage |
|---|---|
| Resin: | |
| Dow DER 331 | 13.1% |
| Epoxy Resin | |
| Furfural Alcohol | 3.3% |
| Hardener | |
| DOW DEH 58 | 3.5% |
| Diethylene Triamine modified with Bisphenol A | |
| E6TPP Borg Warner | 3.5% |
| Triphenyl Phosphate | |
| Sand | 76.6% |
| Set time is 30 minutes. | |
| Compressive strength at 24 hours is 1,500 psi. | |

This test illustrates that various two component thermosetting organic materials can be applied without mixing. Such materials include polyesters, epoxies, polyurethanes and others. According to the invention, the resin and hardener are formulated into portions of substantially similar or identical densities, then poured into place without premixing. Then, the introduction of an additive or filler, such as sand or aggregate, into the poured materials, blends these components to a homogeneous mixture which is capable of curing to a hardened mass.

EXAMPLES 10–15

The following formulations were prepared. All proportions are given in weight percent unless otherwise noted.

| Components | Example | | | | |
|---|---|---|---|---|---|
| | 10 | 11 | 12 | 13 | 14 |
| Portland cement Type I | 90 | 90 | 90 | — | — |

-continued

| Components | Example | | | | |
|---|---|---|---|---|---|
| | 10 | 11 | 12 | 13 | 14 |
| sodium carbonate | 5 | 5 | 10 | 10 | 10 |
| potassium chloride | 5 | — | — | — | — |
| magnesium formate | — | 5 | — | — | — |
| gypsum free Portland cement | — | — | — | 90 | 50 |
| sand | — | — | — | — | 40 |

These formulations were tested for set time and early strength with results shown in Table A below.

TABLE A

| Example | Initial Set (min.) | Final Set (min.) | 1 Day Strength (psi) | 3 Day Strength (psi) | 7 Day Strength (psi) |
|---|---|---|---|---|---|
| 10 | 3 | 76 | 1,250 | — | — |
| 11 | — | 15 | 250 | — | — |
| 12 | 5 | 14 | 775 | — | 1,300 |
| 13 | 4 | 6 | — | 2,200 | — |
| 14 | 7 | 9 | — | 1,925 | — |

These examples illustrate that various accelerators can be added to the dry cement mix prior to dropping the mix into the water.

EXAMPLE 15

In this example, a dry composition of 19.7% aluminous cement, 40% Portland cement, 40% sand and 0.3% lithium carbonate was prepared and preblended. This formulation was dropped into water at various temperatures to determine the effect that temperature of water has on the final set time of the mix. Results are as follows:

| Water Temperature (°F.) | Final Set (Min.) |
|---|---|
| 70 (tap) | 8 |
| 110 (tap) | 5 |
| 180 (tap) | 3 |
| 32 (salt) | 19 |
| 45 (salt) | 15 |
| 62 (salt) | 14 |
| 80 (salt) | 10 |
| 108 (salt) | 6 |

These examples illustrate the use of heat as a set or cure accelerator. Also, the invention is operable with salt or polluted water instead of fresh tap (i.e., potable) water.

EXAMPLES 16-20

100% Portland cement Type I was poured into water containing a saturated solution of the following accelerators:

| Example | Accelerator(s) |
|---|---|
| 16 | 50:50 mix sodium formate/sodium carbonate |
| 17 | calcium chloride |
| 18 | potassium fluoride |
| 19 | calcium formate |
| 20 | sodium carbonate |

Results on set time and early strength are shown in Table B.

TABLE B

| Example | Initial Set (min.) | Final Set (min.) | 1 Day Strength (psi) | 3 Day Strength (psi) | 7 Day Strength (psi) |
|---|---|---|---|---|---|
| 16 | — | — | 700 | 2,350 | 2,625 |
| 17 | 120 | — | — | — | — |
| 18 | 10 | — | — | — | — |
| 19 | 10 | 13 | 250 | — | — |
| 20 | 60 | 6 | 700 | 1,650 | 2,175 |

This illustrates that solid accelerator compounds can be added to the water rather than to the dry cement mixture.

EXAMPLE 21

A formulation of neat Portland cement of particles having the same drop rate was poured into a 90% water/10% triethanolamine mixture. The triethanolamine acts as an accelerator so that the following properties were obtained.

| INITIAL SET | FINAL SET | EARLY STRENGTH | 1 DAY STRENGTH |
|---|---|---|---|
| 3 minutes | 8 minutes | 2 hours 100 PSI | 275 PSI |

This example illustrates the ability of the invention to be operable with a liquid accelerator added to the water rather than to the dry cement.

EXAMPLE 22

The following example illustrates the modification of a high alumina cement to achieve the desired results of the invention.

| Substance | Formula A | Formula B |
|---|---|---|
| Portland Cement Type I | 40% | 40% |
| "O" Sand | 40% | 40% |
| Conventional High Alumina Cement | 20% | — |
| Modified High Alumina Cement with increased $C_{12}A_7$ | — | — |
| Final Set Time | 8 minutes | 3 minutes |
| 1 Hour Compressive Strength Time | zero | 250 PSI |

EXAMPLES 23-30

The following examples were based upon the preparation of two-inch cubes from a cube mold half filled with water and to which the dry cementitious compositions were added in the same manner as in Examples 1-9.

| Substance | Percentage |
|---|---|
| EXAMPLE 23 | |
| Portland Cement Type I | 16% |
| P40 Sand | 84% |
| One Day Strength = 75 psi | |
| EXAMPLE 24 | |
| Portland Cement Type I | 16% |
| P40 Sand | 83% |
| *JM Micro-Cel | 1% |
| One Day Strength = 150 psi | |
| EXAMPLE 25 | |
| Portland Cement Type I | 16% |
| P40 Sand | 74% |
| Montour's Fly Ash | 10% |
| One Day Strength = 250 psi | |
| EXAMPLE 26 | |

-continued

| Substance | Percentage |
| --- | --- |
| Portland Cement Type I | 16% |
| P40 Sand | 73% |
| *JM Micro-Cel | 1% |
| Montour's Fly Ash | 10% |
| One Day Strength = 325 psi | |
| EXAMPLE 27 | |
| Portland Cement Type I | 15% |
| P40 Sand | 85% |
| One Day Strength = 50 psi | |
| EXAMPLE 28 | |
| Portland Cement Type I | 15% |
| P40 Sand | 84% |
| *JM Micro-Cel | 1% |
| One Day Strength = 75 psi | |
| EXAMPLE 29 | |
| Portland Cement Type I | 15% |
| P40 Sand | 75% |
| Montour's Fly Ash | 10% |
| One Day Strength = 175 psi | |
| EXAMPLE 30 | |
| Portland Cement Type I | 15% |
| P40 Sand | 74% |
| *JM Micro-Cel | 1% |
| Montour's Fly Ash | 10% |
| One Day Strength = 225 psi | |

*JM Micro-Cel is a Johns-Manville product. It is a synthetic calcium silicate with an extraordinary high liquid absorption capacity because of its very high surface area. However, it is not a hydraulic cement.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of installing a cementitious composition in a hole comprising:
   (a) providing a dry fast setting cementitious composition having a set time and comprising particles of at least one cement binder, a majority of the particles being finely divided;
   (b) providing a hole;
   (c) providing a volume of water in the hole;
   (d) pouring an amount of the dry cementitious composition into the volume of water, the volume of water being greater than an amount of water necessary for hydration of the amount of the cementitious composition, the water contacting the particles of the cementitious composition and hydrating the particles, the particles having a drop rate and a major portion of the particles of the cementitious composition having approximately the same drop rate through the volume of water;
   (e) allowing the hydrated cementitious composition to drop through the water, displacing excess water as a result of the dropping of the cementitious composition; and
   (f) allowing the hydrated cementitious composition to form into a cured substantially non-segregated mass.

2. A method of installing a cementitious composition in a hole comprising:
   (a) providing a dry fast setting cementitious composition having a set time and comprising particles of at least one cement binder;
   (b) providing a hole;
   (c) providing a volume of water in the hole;
   (d) pouring an amount of the dry cementitious composition into the volume of water without any type of physical mixing of the cementitious composition and water other than mixing which occurs merely by pouring the cementitious composition into the volume of water;
   (e) a major portion of the particles of the cementitious composition having approximately the same drop rate through the water;
   (f) the water contacting the dry cementitious composition when poured into the volume of water to hydrate the particles of the dry cementitious composition, the particles of the hydrated cementitious composition dropping through the volume of water to displace excess water and form the hydrated cementitious composition into a substantially non-segregated mass; and
   (g) allowing the hydrated cementitious composition to set and cure to a solid mass for at least the set time.

3. A method of installing a cementitious composition in a hold comprising:
   (a) a providing a dry fast setting cementitious composition comprising particles of at least one cement binder, the composition having a set time;
   (b) providing a hole;
   (c) providing a volume of water in the hole;
   (d) pouring the dry cementitious composition into the volume of water;
   (e) a major portion of the particles of the cementitious composition having approximately the same drop rate through the volume of water so that the water contacts the particles of cementitious composition and hydrates the particles as the particles drop through the water;
   (f) allowing the hydrated cementitious composition to drop through the water displacing excess water as a result of dropping the cementitious composition through the water; and
   (g) allowing the hydrated cementitious composition to form into a cured, substantially non-segregated mass.

4. The method of claim 1, 2, or 3 wherein the set time is less than about ten minutes.

5. The method of claim 1, 2, or 3, wherein the set time is about ten minutes.

6. The method of claim 1, 2, or 3 wherein the set time is less than about five minutes.

7. The method of claim 1, 2, or 3, wherein the set time is about five minutes.

8. The method of claim 1, 2, or 3, wherein the at least one cement binder is present in at least about 20 weight percent of the cementitious composition.

9. The method of claim 1, 2, or 3, wherein the at least one cement binder comprises one or more of Portland cement, gypsum, high aluminum cement, magnesium phosphate fly ash or a combination thereof.

10. The method of claim 1, 2, or 3, wherein the cementitious composition further comprises an amount of a filler component to provide a mixture having at least about 35 percent by weight of cement binder; the filler component in a form of particles, a major portion of which have approximately the same drop rate as the cement binder particles.

11. The method of claim 10, wherein the filler component is sand or aggregate.

12. The method of claim 1, 2, or 3, wherein the cementitious composition further comprises a filler component of sand or aggregate.

13. The method of claim 1, 2, or 3, wherein the cementitious composition is dry blended to a homogenous consistency.

14. The method of claim 1, 2, or 3, further comprising adding a sufficient amount of additional cement to absorb a portion of the excess water.

15. The method of claim 1, 2, or 3, wherein the cementitious composition further comprises at least one of an accelerator, water reducing compound, pumping aid, water absorbing compound, water proofing agent, polymer, wet expansion inhibitor or drying shrinkage inhibitor to impart a specific property tot he cementitious composition.

16. The method of claim 1, 2, or 3, wherein the at least one cement binder is present in an amount of at least 35 percent by weight of the cementitious composition.

* * * * *